US012248626B2

(12) United States Patent
Nistico et al.

(10) Patent No.: US 12,248,626 B2
(45) Date of Patent: Mar. 11, 2025

(54) HYBRID GAZE TRACKING SYSTEM

(71) Applicant: APPLE INC., Cupertino, CA (US)

(72) Inventors: Walter Nistico, Redwood City, CA (US); Patrick R. Gill, Victoria (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/681,275

(22) PCT Filed: Aug. 5, 2022

(86) PCT No.: PCT/US2022/039555
§ 371 (c)(1),
(2) Date: Feb. 5, 2024

(87) PCT Pub. No.: WO2023/027881
PCT Pub. Date: Mar. 2, 2023

(65) Prior Publication Data
US 2024/0353923 A1    Oct. 24, 2024

Related U.S. Application Data

(60) Provisional application No. 63/236,902, filed on Aug. 25, 2021.

(51) Int. Cl.
*G06F 3/01* (2006.01)
*G06V 40/18* (2022.01)

(52) U.S. Cl.
CPC .............. *G06F 3/013* (2013.01); *G06V 40/18* (2022.01)

(58) Field of Classification Search
CPC ................................ G06F 3/013; G06V 40/18
See application file for complete search history.

(56) References Cited

U.S. PATENT DOCUMENTS 11,346,943 B1   5/2022  Scally et al.
2016/0364881 A1* 12/2016  Mallinson ................. G06T 7/20
(Continued)

FOREIGN PATENT DOCUMENTS

GB        2574472 A      12/2019
WO     2023015023 A1      2/2023

OTHER PUBLICATIONS

European Patent Office, International Search Report and Written Opinion of the International Search Authority, International Application No. PCT/US2022/039555, 14 pages, Nov. 18, 2022.
(Continued)

*Primary Examiner* — Parul H Gupta
(74) *Attorney, Agent, or Firm* — Thompson Hine LLP

(57) ABSTRACT

Various implementations disclosed herein include devices, systems, and methods that perform gaze tracking using combinations of ultrasound and imaging data. Some implementations detect a first attribute of an eye using imaging measurements in a first image of the eye, and a first location associated with the first attribute is determined in a 3D coordinate system based on depth information. A second attribute of the eye is detected based on depth information from ultrasound based measurements of the eye, and a second location associated with the second attribute is determined in the 3D coordinate system based on the depth information and a 3D model of a portion of the eye. A gaze direction in the 3D coordinate system is determined based on the first location and the second location. In some implementations, user characteristics are identified (e.g., authentication) using ultrasonic biometric characteristics with imaging biometrics.

20 Claims, 6 Drawing Sheets

(56) References Cited

U.S. PATENT DOCUMENTS

2017/0261610 A1     9/2017   Scally et al.
2018/0342066 A1*   11/2018   Mallinson ............... G06F 3/015
2019/0377191 A1*   12/2019   Hughes .............. G02B 27/0176

OTHER PUBLICATIONS

Kaputa, D. and Enderle, J.D., "An Ultrasound Based Eye Tracking System," Journal of Biomedical Engineering and Medical Devices, vol. 1, No. 1, 4 pages, 2016.

Goland, A. and Talathi, S.S., "Ultrasound for Gaze Estimation—A Modeling and Empirical Study," Sensors, vol. 21, No. 13, 13 pages, 2021.

* cited by examiner

HYBRID GAZE TRACKING SYSTEM

CROSS-REFERENCE TO RELATED APPLICATIONS

This patent application is the national stage of International Application No. PCT/US2022/039555 filed on Aug. 5, 2022, which claims the benefit of U.S. Provisional Application No. 63/236,902 filed on Aug. 25, 2021, entitled "HYBRID GAZE TRACKING SYSTEM," each of which is incorporated herein by this reference in its entirety.

TECHNICAL FIELD

The present disclosure generally relates to gaze tracking for electronic devices, and in particular, to systems, methods, and devices for providing gaze tracking for head-mounted devices (HMD).

BACKGROUND

Existing computing systems, sensors and applications may not adequately provide gaze tracking that is robust to various environmental conditions.

SUMMARY

Various implementations disclosed herein include hybrid devices, systems, and methods that perform gaze tracking for HMDs using combinations of ultrasound and imaging data.

Various implementations disclosed herein include devices, systems, and methods that perform gaze tracking using both imaging data and ultrasound data. In some implementations, such gaze tracking is more robust than either approach alone because imaging data is less affected by temperature, pressure, and air flow, and ultrasound data is less affected by stray light. In some implementations, different combinations of ultrasound data and light-based measurement data are used to effectively counter environmental noise, obtain desired accuracy, obtain desired power consumption rates, or combinations thereof. In some implementations, user authentication is improved by including additional ultrasonic biometric characteristics to imaging biometric characteristics.

In general, one innovative aspect of the subject matter described in this specification can be embodied in methods that include the actions of detecting a first attribute of an eye using light-based measurements in a first image of the eye, and determining a first location associated with the first attribute in a three dimensional (3D) coordinate system based on first depth information. In some implementations, a second attribute of the eye is detected based on second depth information from ultrasonic based measurements of the eye, and a second location associated with the second attribute is determined in the 3D coordinate system based on the second depth information from the ultrasound sensor and a 3D model of a portion of the eye. Then, a gaze direction in the 3D coordinate system is determined based on the first location and the second location.

In general, one innovative aspect of the subject matter described in this specification can be embodied in systems that include an image sensor configured to obtain images of the eye based on light reflecting off the eye, and an ultrasound sensor that includes at least one ultrasonic transmitter configured to transmit ultrasonic sound towards an eye of a user of an electronic device, and at least one ultrasonic receiver configured to receive an echo generated by interaction of the ultrasonic sound with the eye, wherein the ultrasound sensor is configured to obtain depth information of the eye in a 3D coordinate space. Then, a processor is configured to perform gaze tracking using the image sensor and the ultrasound sensor.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
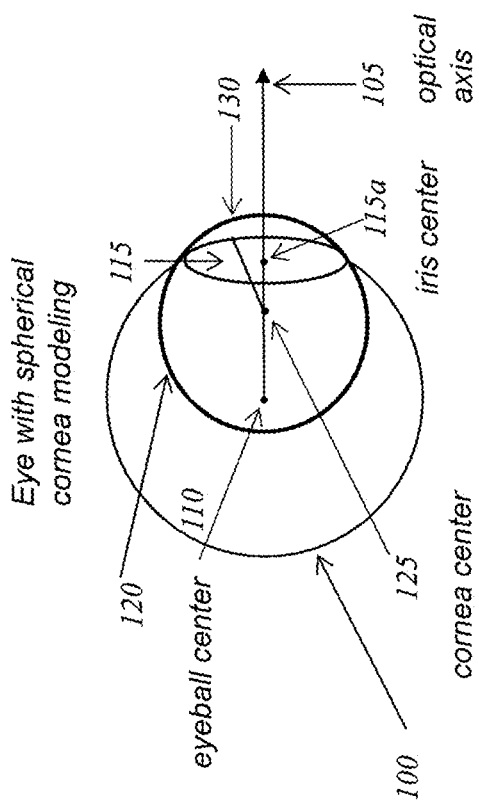
FIG. 1 is a diagram depicting a 3D representation of an eyeball.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that implement hybrid gaze tracking approaches that use both image data and ultrasound data. In some implementations, gaze may be tracked using ultrasound data alone to identify 3D spatial coordinates of portions of the eye and these locations may be matched against an eye model. In some implementations, gaze may be tracked using imaging data alone to determine eye position or eye orientation using a pupil plus glint model, using a depth camera (e.g., stereo, structured light projection, time-of-flight (ToF), etc.) with 3D point cloud registration, or using an appearance based model. In some implementations, gaze tracking using both imaging data and ultrasound data is more robust than either approach alone because imaging data is less affected by temperature, pressure, and air flow, and ultrasound data is less affected by stray light.

Various implementations disclosed herein include devices, systems, and methods that implement gaze tracking using ultrasound data and imaging data in different combinations or integrations. In some implementations, gaze tracking includes a first mode during a first time interval that always uses ultrasound data for gaze estimation (e.g., always on, lower accuracy), and triggers imaging based gaze estimation on demand (e.g., enabled for selected uses, limited use, higher accuracy). For example, ultrasound data for gaze tracking is used to identify saccades or eye motions over a threshold amount. In some implementations, gaze tracking includes a second mode during a second time interval that uses imaging based gaze tracking at a selected frame rate (e.g., low frames per second) and uses ultrasound data for gaze tracking to fill in between the imaging data frames at the selected frame rate. For example, ultrasound data implements gaze tracking sufficient to maintain gaze tracking between the imaging data frames. In some implementations, gaze tracking includes a third mode during a third time interval that uses only 2D image data (e.g., 2D camera data) to detect portions of the eye (e.g., detect pupil or glint) and uses ultrasound data for depth measurements. In some implementations, gaze tracking using ultrasound data and imaging data in various combinations results in a lower power consumption rate or an overall reduced power consumption.

FIG. 1 is a diagram depicting a 3D representation of an eyeball to illustrate example eyeball modeling implementations for gaze tracking. A cornea 120 is the transparent front part of an eye 100 that covers the iris, pupil, and anterior chamber of the eye 100. As shown in FIG. 1, the 3D representation of the eye 100 uses a spherical model of the cornea 120. Other 3D representations of the cornea 120 can alternatively be used. In some implementations, an eyeball model of the eye 100 is generated independently or uniquely for each user or person. As shown in FIG. 1, the 3D representation of the eye 100 shows an optical axis 105.

In some implementations, the optical axis 105 may be identified and used as an indication of a gaze direction of the eye 100. In some implementations, the visual axis may be identified and used as an indication of the gaze direction of the eye 100. The visual axis is the actual gaze direction, as perceived by the user, and has an angular offset from the observable optical axis 105. The angular offset (e.g., 2 degrees vertically and 5 degrees horizontally) between visual axis and the optical axis 105 can vary by each individual person. In some implementations, the visual axis extends from the fovea (e.g., region of highest visual acuity on the retina) and passes through the nodal point of the cornea-crystalline lens optical system (e.g., approximated with the center of curvature of the cornea) and is generally non-observable. Thus, in some implementations, the offset between the visual axis and the optical axis 105 is usually calibrated with an enrollment procedure where a user is required to fixate a stimulus (e.g., dot) at known locations, and the offset between the measured optical axis and the actual location of the target is the visual axis offset. In some implementations, when the image data (e.g., image sensor) includes images of the retina, the location of the fovea can be determined, and the visual-optical axis offset is measured directly.

In some implementations, estimating the gaze direction of the eye is based on determining two locations on the optical axis 105. Some implementations determine a 3D spatial position of the iris center 115a and a 3D spatial position of a cornea center 125 as the two locations on the optical axis 105. Some implementations determine a 3D spatial position of the eyeball rotation center 110 and a 3D spatial position of the cornea center 125 as the two locations on the optical axis 105. The two positions can be determined based on information from various sensors on a device, known relative spatial positions of those sensors (e.g., extrinsic parameters of an imaging system 220 and an ultrasound system 220 reflecting their positional characteristics are known), and generic or user-specific eye models.

In some implementations, a position of the cornea center 125 is determined based on identifying spatial attributes of the cornea 120. For example, the 3D spatial position of the cornea (e.g., the depths/locations of one or more glints on the surface of the cornea) may be determined using a sensor (e.g., a sensor configured to detect glints generated from an illumination source on the device). The position of the cornea center 125 may then be determined based on the spatial position of the cornea and a cornea model. In some implementations, images of a user's eyes captured by gaze tracking cameras may be analyzed to detect glints from light sources and the pupil. For example, the glint-light source matches are used to determine the cornea center 125, the pupil center is determined, which together are used to determine the optical axis 105.

In some implementations, an ultrasound sensor can determine an eye position by matching a point cloud of range measurements against a known model of the eye 100 to determine positions/orientations of portion of the eye 100. In some implementations, an ultrasound sensor detects a portion of the surface of the cornea 120 as a bulge with a 3D position and orientation to determine the gaze direction. In some implementations, the detected portion of the surface of the cornea 120 is compared to known 3D eye model to determine the cornea center 125 based on the surface of the detected bulge of the cornea 120 to a spherical model of the cornea 120.

In some implementations, a position of the iris center 115a is determined based on identifying spatial attributes of the iris. For example, the 3D spatial position of the iris (e.g., a iris plane 115, iris boundary (not shown), etc.) may be determined using one or more RGB or IR images of the eye 100 and depth values from a depth map corresponding to the RGB or IR images. The iris center 115a may then be determined based on the spatial attributes of the iris and a generic or user-specific model of the eye 100. In some implementations, the rotation center 110 of the eye 100 may then be determined based on the spatial position of the iris.

In some implementations, a position of the eyeball rotation center 110 is determined based on identifying spatial attributes of the limbus (e.g., limbus center). For example, the 3D spatial position of the limbus may be determined using one or more RGB images of the eye and depth values from a depth map corresponding to the RGB images. In some implementations, given 2D images of the limbus and a previously determined limbus model, the pose (e.g., 3D position and 3D orientation) of the limbus may then be determined. The rotation center of the eyeball 110 may then be determined based on the spatial position of the limbus.

In some implementations, a position of the eyeball rotation center 110 is determined based on identifying spatial attributes of the sclera (e.g., sclera surface). For example, the 3D spatial position of the sclera may be determined using one or more RGB images of the eye, the surface of portions of the sclera can be determined in the corresponding depth information, and the sclera surface is used to determine a 3D position of the rotation center 110 of the eye 100. In some implementations, additional portions (e.g., pupil) of the eye 100 are used to determine the gaze direction or orientation of the optical axis 105

Figure 2:
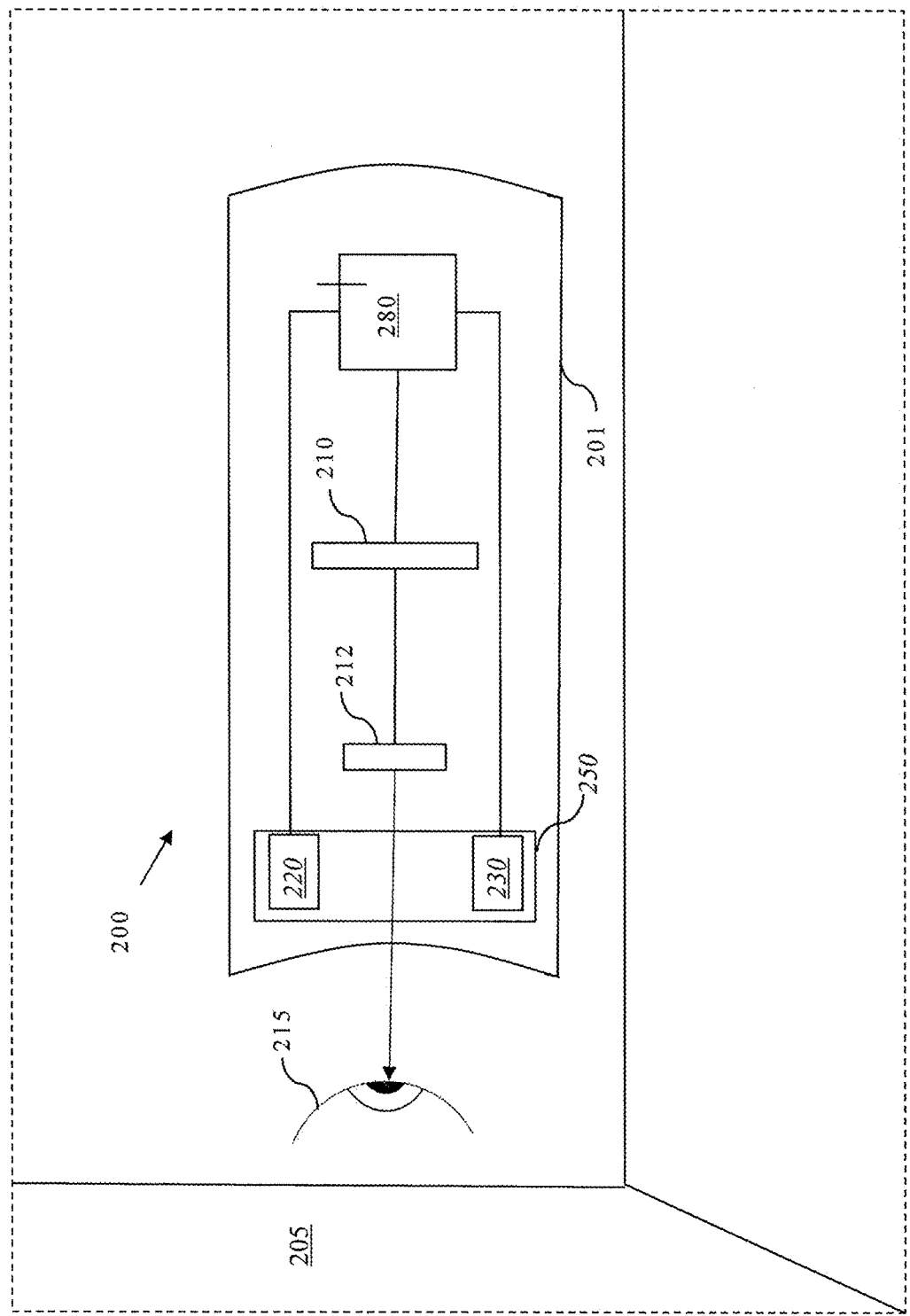
FIG. 2 illustrates a diagram of an exemplary HMD in accordance with some implementations.

FIG. 2 illustrates a block diagram of an exemplary electronic device in accordance with some implementations. In some implementations, HMD 200 includes a gaze tracking system that can detect eye position and eye movements. As shown in FIG. 2, an environment 205 includes the HMD 200 being used by a user 215. In various implementations, the HMD 200 is configured with a plurality of sensors to perform gaze or eye tracking of the user 215. As shown in FIG. 2, the user 215 has positioned the HMD 200 in the environment 205 for use where the face (e.g., one or both eyes) of the user 215 is visible to the HMD 200.

In some implementations, the HMD 200 includes a display, a tunable lens, or both. As shown in FIG. 2, the HMD 200 includes a housing 201 (or enclosure) that houses various components of the HMD 200. The housing 201 houses a display 210 that displays an image, emitting light towards or onto the eye of the user 215. In various implementations, the display 210 emits the light through an eyepiece having one or more lenses 212 that refracts the light emitted by the display 210, making the display appear to the user 215 to be at a virtual distance farther than the actual distance from the eye to the display 210. For the user 215 to be able to focus on the display 210, in various implementations, the virtual distance is at least greater than a minimum focal distance of the eye (e.g., 7 cm). Further, in order to provide a better user experience, in various implementations, the virtual distance is greater than 1 meter.

The housing 201 also houses a gaze tracking system 250 including an imaging system 220, an ultrasound system 230, and a controller 280. In some implementations, images or depth information captured by the gaze tracking system 250 may be analyzed to detect position and movements of the eyes of the user 215, or to detect a gaze direction of one or both eyes. In some implementations, the gaze tracking system 250 may detect other information about the eyes such as blinking (e.g., rate or duration), pupil dilation, or saccadic movements. Moreover, the point of gaze estimated from the gaze tracking system 250 may enable gaze-based interaction with content shown on the near-eye display of the HMD 200.

Based on data from the imaging system 220 and the ultrasound system 230, the controller 280 can determine a gaze tracking characteristic of the user 215. For example, the controller 280 can determine a gaze direction of one or both eyes of the user 215. In another example, the controller 280 can determine a blinking state (eyes open or eyes closed) of the user 215. As yet another example, the controller 280 can determine saccadic movements, a pupil center, a pupil size, or a point of regard. In addition, the controller 280 can determine an identify of the user 215 or a pose of an eye of the user 215 relative to a pose of the HMD 200.

In some implementations, the display 210 emits light in a first wavelength range and the imaging system 220 uses (e.g., emits/detects) light in a second wavelength range. In some implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In some implementations, gaze tracking (or, in particular, a determined gaze direction) is also used to enable user interaction (e.g., the user 215 selects an option on the display 210 by looking at it), provide foveated rendering (e.g., present a higher resolution in an area of the display 210 the user 215 is looking at and a lower resolution elsewhere on the display 210), or correct distortions (e.g., for images to be provided on the display 210 or to enhance the experience of viewing real-world objects). In some implementations, the display 210 displays left eye and right eye stereoscopic images that when viewed by the user 215 to provide 3D content.

In various implementations, the imaging system 220 includes a frame/shutter-based camera that, at a particular point in time or multiple points in time at a frame rate, generates an image of the eye of the user 215. Each image includes a matrix of pixel values corresponding to pixels of the image which correspond to locations of a matrix of light sensors of the camera.

In some implementations, the ultrasound system 230 and the imaging system 220 integrate or combine their operations (e.g., detected data) to perform gaze tracking. In some implementations, an imaging sensor can determine a gaze direction using a pupil plus glint model, or as a depth camera (e.g., stereo, structured light projection, or ToF) with 3D point cloud registration, or using an appearance based model and depth information. In some implementations, a depth sensor (e.g., depth camera) is capable of detecting reflectance and distance information of the eye at real-time video frame rates. Depth cameras include active triangulation, or passive triangulation. Alternatively, depth information can also be acquired by different techniques such as stereo imaging or any other depth sensor.

Figure 3:
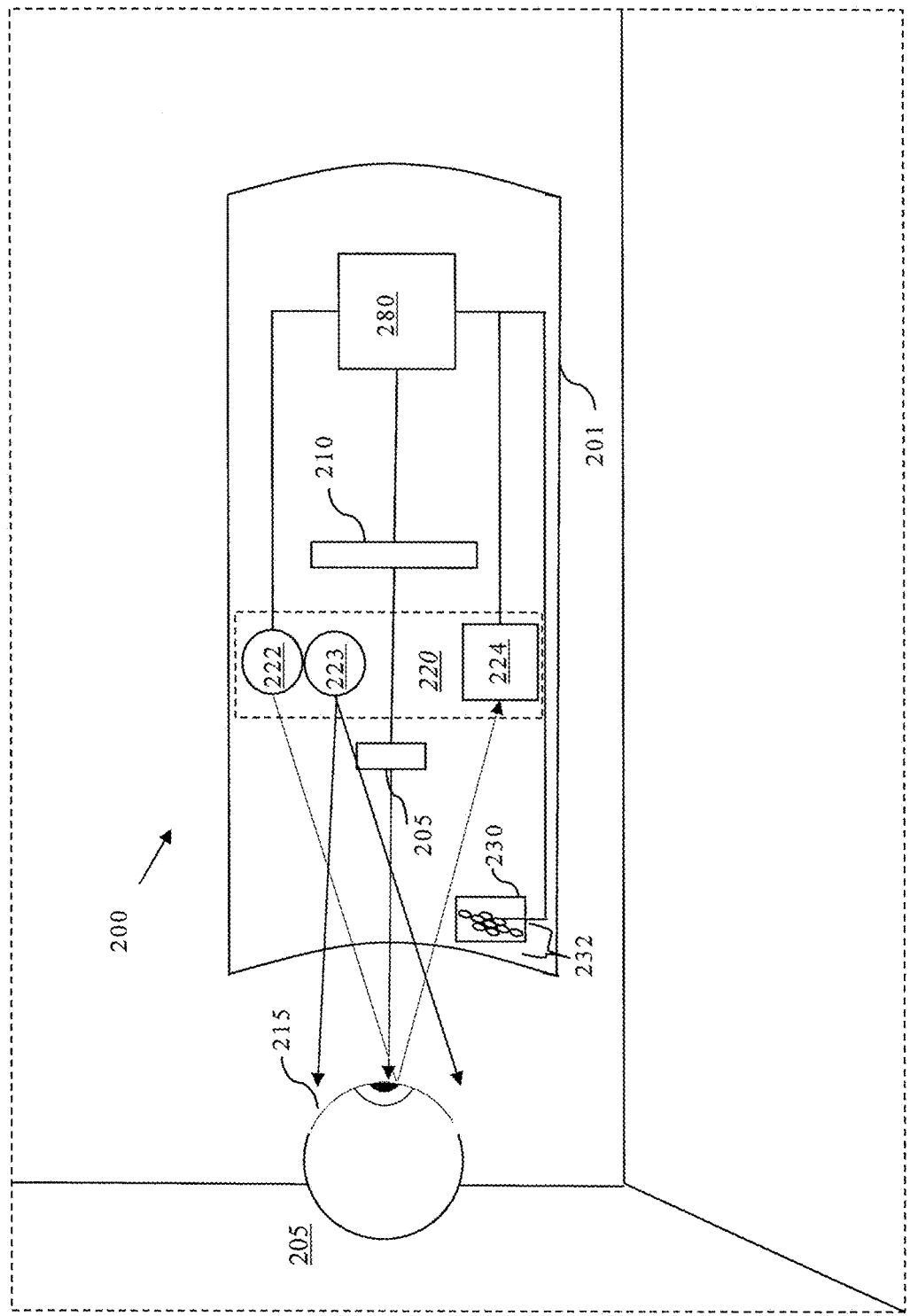
FIG. 3 illustrates a diagram of an exemplary HMD in accordance with some implementations.

FIG. 3 illustrates a block diagram of an exemplary HMD in accordance with some implementations. As shown in FIG. 3, the imaging system 220 of the gaze tracking system 250 includes one or more light sources 222 to emit light onto the eye of the user 215 that reflects as a light pattern (e.g., glints) that can be detected by an image sensor 224.

For example, the light sources 222 may include one or more infrared (IR) or near-IR (NIR) light-emitting diodes (LEDs) that emit light towards the eye of the user 215 that reflects in the form of a plurality of glints from the cornea and an optional illumination source 223 that emits light towards the eyes of the user 215. In some implementations, the illumination source 223 is a flood IR light source. The image sensor 224 may operate as a gaze tracking camera (e.g., IR/NIR camera). The light sources 222 or the illumination source 223 may emit NIR light to illuminate the eyes of the user 215 and the image sensor 224 may capture images of the eyes of the user 215. In some implementations, the illumination source 223 is a dot projector that projects 10,000, 20,000 or more than 30,000 IR dots for detection in an image of the image sensor 224. In some implementations, the dot projector illumination source 223 and the image sensor 224 jointly operate as a depth sensor. In other implementations, the imaging system 220 includes an RGB-D camera that sequentially generates both RGB images and depth images.

In some implementations, the ultrasound system 230 (FIG. 2) uses a frequency that propagates only a few centimeters in air. For example, the ultrasound system 230 can operate around 1 MHz frequency. In some implementations, an ultrasound sensor 232 for the ultrasound system 230 include multiple arrays (e.g., 1-3 mm in diameter) that each include 50-100 different ultrasonic resonators that can measure (e.g., transmit/receive) phase, amplitude, and frequency of ultrasonic signals. In some implementations, the ultrasound sensor 232 uses piezoelectric micromachined ultrasound transducers.

In some implementations, the ultrasound sensor 232 for the ultrasound system 230 includes at least one ultrasonic transmitter configured to transmit ultrasonic sound towards the eye of the user 215 and a plurality of ultrasonic receivers configured to receive an echo generated by interaction of the ultrasonic sound with the eye of the user 215. In some implementations, the plurality of ultrasonic receivers has a prescribed spatial arrangement with respect to the at least one ultrasonic transmitter. The ultrasound sensor 232 determines depth information of the eye in a 3D coordinate space using characteristics (e.g., timing, phase, amplitude) of ultrasonic sound from the one ultrasonic transmitter and the echo received by each of the plurality of ultrasonic receivers.

In some implementations, a depth measurement of the eye of the user 215 is determined by initiating a single ultrasonic transmitter and measuring resonating signals (e.g., phase and amplitude) of a set of ultrasonic receivers (e.g., 4, 8, 12, etc.) having a preset 3D spatial relationship to the single ultrasonic transmitter. In some implementations, a depth measurement of the eye of user 215 is determined by initiating several ultrasonic transducers at a variety of frequencies such that the phases observed at ultrasonic receivers tuned to the same frequencies are consistent with only one depth. The transmitted and received signals for the arrangement of the ultrasonic transmitter and the set of ultrasonic receivers is satisfied by only one distance, which is that depth. In some implementations, a depth measurement of the eye of the user 215 is determined by initiating multiple ultrasonic transmitters at the same time and measuring corresponding resonating signals resulting in different sets of spatially arranged ultrasonic receivers. In some implementations, the depth measurements of the eye of the user 215 from the ultrasound sensor 232 are sequentially determined. In some implementations, a frame of depth data from the ultrasound sensor 232 includes a portion of the eye or the entire eye of the user 215.

In some implementations, each independent depth measurement for a location on the surface of the eye of the user 215 is accomplished in a few 100 microseconds by the ultrasound sensor 232. For example, a 100 Hertz frame rate of different independent depth measurements of the eye of the user 215 for gaze tracking can be accomplished by the ultrasound sensor 232 determining 10 to 12 independent depth measurements every 10 milliseconds. Other known implementations of the ultrasound sensor 232 can be implemented in the ultrasound system 230.

In some implementations, when the depth measurements of the ultrasound sensor 232 are combined with data from the imaging system 220, the number of depth measurements or the frame rate of the depth measurements can be reduced. For example, the frame rate of the depth measurements from the ultrasound sensor 232 can be 10 Hz, 20 Hz, or 40 Hz when combined with the data from the imaging system 220. Thus, the frame rate of the depth measurements from the ultrasound sensor 232 can be reduced and still be sufficient to allow interpretation of light-based measurements obtained by the imaging system 220 for gaze tracking of the user 215

In some implementations, when the depth measurements of the ultrasound sensor 232 are combined with data from the imaging system 220, the type of data or the amount of a type of data from the imaging system 220 can be reduced. For example, when the location of the eye of the user 215 is known from the ultrasound sensor 232, the image sensor 224 can be used to locate the pupil in the image and measure a direction vector by detecting the corneal glint in the image. However, the depth information of the corneal glint can be provided by the ultrasound sensor 232.

In some implementations, ultrasound range measurement accuracy of the ultrasound system 230 is affected by air flow; temperature fluctuations, or pressure fluctuations, which do not affect range measurements from image sensors or depth sensors of the imaging system 220. Thus, distance measurements the imaging system 220 can be used as reference values to correct for drift or for in-field calibration of ultrasound range measurements of the ultrasound system 230.

In some implementations, light-based measurement quality of the imaging system 220 is affected by stray light (e.g., sunlight, ambient light, saturated sensor pixels), which do not affect range measurements from ultrasonic transmitters/receivers of an ultrasound sensor of the ultrasound system 230. Thus, ultrasound range measurements of the ultrasound system 230 can be used as reference values to correct for incorrect eye pose estimations or for in-field calibration of the imaging system 220. Accordingly, a combination of data from the imaging system 220 and the ultrasound system 230 of the gaze tracking system 250 provides a more robust gaze tracking functionality.

In some implementations, the imaging system 220 and the ultrasound system 230 each generates signals that represent reliability of its data or current measurements. For example, sunlight can reduce contrast in an image or render portions of the image unusable (e.g., saturate some pixels). The imaging system 220 can be monitored for data reliability and the ultrasound system 230 can be prioritized for gaze tracking when the imaging system 220 reliability is reduced. In some implementations, ultrasound sensors for the ultrasound system 230 include multiple tiny phased arrays (e.g., 1-3 mm in diameter) that each include 50-100 different ultrasonic units that can measure signals (e.g., transmitted/received) such as phase and amplitude. In low noise conditions, (e.g., little turbulence or wind), measurements in the ultrasound system 230 will provide an internally consistent set of measurements. Thus, the ultrasound system 230 can be monitored for data reliability and the imaging system 220 can be prioritized for gaze tracking when the ultrasound system 230 reliability is reduced.

Modes of Operation

In some implementations, the ultrasound system 230 and the imaging system 220 integrate or combine their operations (e.g., detected data) to perform gaze tracking.

In some implementations, an electronic device is configured to alternately operate in or switch between a plurality of gaze tracking modes, where each mode (e.g., when executing) of the gaze tracking modes uses different combinations of first data of an image sensor and second data of an ultrasound sensor. For example, each mode of the gaze tracking modes uses different combinations of first data of the imaging system 220 and second data of the ultrasound system 230. In some implementations, the ultrasound system 230 is always enabled for gaze tracking in a first mode of gaze tracking in a first period of time. In some implementations, the ultrasound system 230 is always enabled for gaze tracking, but can trigger the imaging system 220 for gaze tracking under selected conditions. For example, gaze tracking by the imaging system 220 can be triggered based on a specific application or functionality (e.g., user authentication using an iris image) being used by the HMD 200. In some implementations, the ultrasound system 230 provides gaze tracking with lower accuracy than the imaging system 220. Accordingly, the ultrasound system 230 or the imaging system 220 is selected for gaze tracking based on a desired degree of accuracy for the gaze tracking. In some implementations, because the eyes of people are generally stable with little movement, the ultrasound system 230 can be used when the eye movement is below a movement threshold. Then, the ultrasound system 230 can trigger the imaging system 220 when the eye movement goes above the movement threshold (e.g., saccades) Alternatively, the user 215 can explicitly select gaze tracking by the imaging system 220. In other implementations, a second mode of gaze tracking in a second period of time that switches between using only the ultrasound sensor and using only the imaging system 220 (e.g., an image sensor and corresponding depth data from a depth sensor). In some implementations, a third mode of gaze tracking in a third period of time supplements data from the image sensor for gaze tracking with the depth information of the eye from the ultrasound sensor. For example, the third mode can use the imaging system 220 for gaze tracking at a low rate (e.g., low frames-per-second) and the ultrasound system 230 provides gaze tracking in gaps between the low rate gaze tracking by the imaging system 220. Operating the imaging system 220 at a reduced frame rate with the ultrasound system reduces the power consumption rate of the HMD 200 while maintaining accurate gaze tracking. In another example, the third mode can use the imaging system 220 to capture 2D images (e.g., at a standard or reduce rate) used to detect a portion of the eye (e.g., pupil, limbus, cornea) and a spatial relationship between the imaging system 220 and the ultrasound system 230 is used to provide correlated depth data (e.g., in a 3D coordinate system) for the detected portion of the eye for gaze tracking. For example, the detected portion of the eye and the correlated depth data is used with a 3D model of the eye to determine the gaze direction. In some implementations, a fourth mode of gaze tracking in a fourth period of time uses the imaging system 220 to detect a first point on the optical axis, and the ultrasound system 230 to determine a second point on the optical axis, wherein the gaze tracking is based on the first point and the second point.

In some implementations, the ultrasound system 230 is used for gaze tracking in a first mode (e.g., a low power mode), a first combination of the ultrasound system 230 and the imaging system 220 is used for gaze tracking in a second mode (e.g., a first middle power mode), a second combination of the ultrasound system 230 and the imaging system 220 is used for gaze tracking in a third mode (e.g., a second middle power mode), and the imaging system 220 is used for gaze tracking in a fourth mode (e.g., a high power mode). In this example, power consumption in the first mode is less than the second mode, which is less than the third mode, which is less than the fourth mode.

Other Uses

In some implementations, the shape of the eye (e.g., cornea) for a young enough eye, changes to accommodate for different focus distances of the eye. The shape of the eye can be measured for different accommodation ranges and the shape changes are idiosyncratic with each individual and each eye of the individual. Thus, using the gaze tracking system 250, the shape of the eye of the user 215 detected at a preset frame rate and used to estimate the distance at which the user 215 is focusing/looking. In some implementations one or both of the eyes of the user 215 can be used to estimate the distance at which the user 215 is focusing. Accordingly, the gaze tracking system 250 can determine a focal intent using an accommodation signature of the eye of the user 215.

In some implementations, a combination of image features from the imaging system 220 and ultrasound features from the ultrasound system 230 are combined and used by the gaze tracking system 250 for identification purposes (e.g., of the user 215). Image features that can be used for identification of the user 215 include blood vessels in retinal images, shapes of the eyelids, iris textures and the like.

Figure 4:
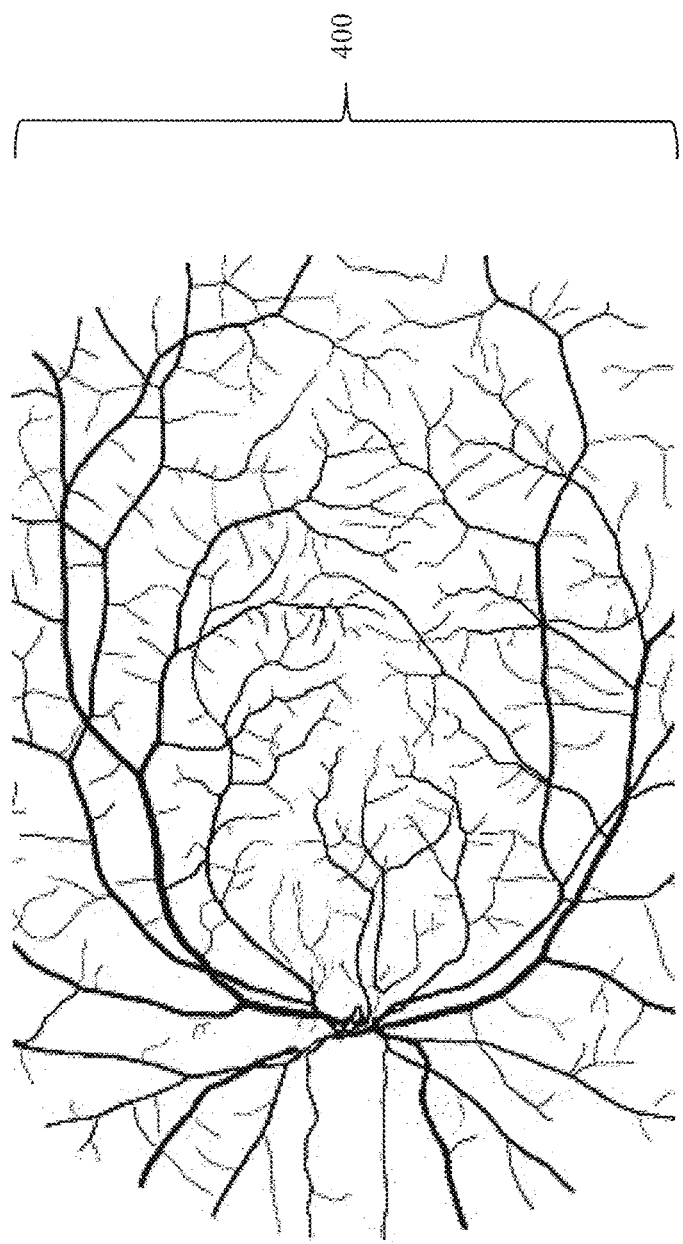
FIG. 4 is a diagram that illustrates an example image including features of a retina in accordance with some implementations.

FIG. 4 is a diagram that illustrates an example image including features of a retina. As shown in FIG. 4, a retinal image 400 includes image features of the user 215 including a portion of the retina such as blood vessels that can be used for identification or authentication of the user 215. In some implementations, the gaze tracking system 250 combines user specific ultrasonic characteristics with image features characteristics of the eye of the user 215 that can be obtained simultaneously, or for use at the same time.

In some implementations, adding user specific ultrasound signatures (e.g., characteristics) combined with image features provides a more robust, unique signature of characteristics of the eye of the user 215. For example, user specific ultrasonic characteristics may include size of the eyeball, curvature of the eyeball, different radius of corneal curvature, or other physical shapes of the eye. Further, it may be more difficult to try to mimic these ultrasonic physical features (e.g., relative to mimicking the appearance of image features) to mimic the identity of another user or different person.

In some implementations, the ultrasound system 230 can determine the pose (position and orientation) of the HMD 200 relative to the pose of the eyeball of the user 215. For example, such measurements from the ultrasound system 230 can be used to ensure the correct positioning of the HMD 200 or alert the user 215 when the HMD 200 is not correctly positioned.

Figure 5:
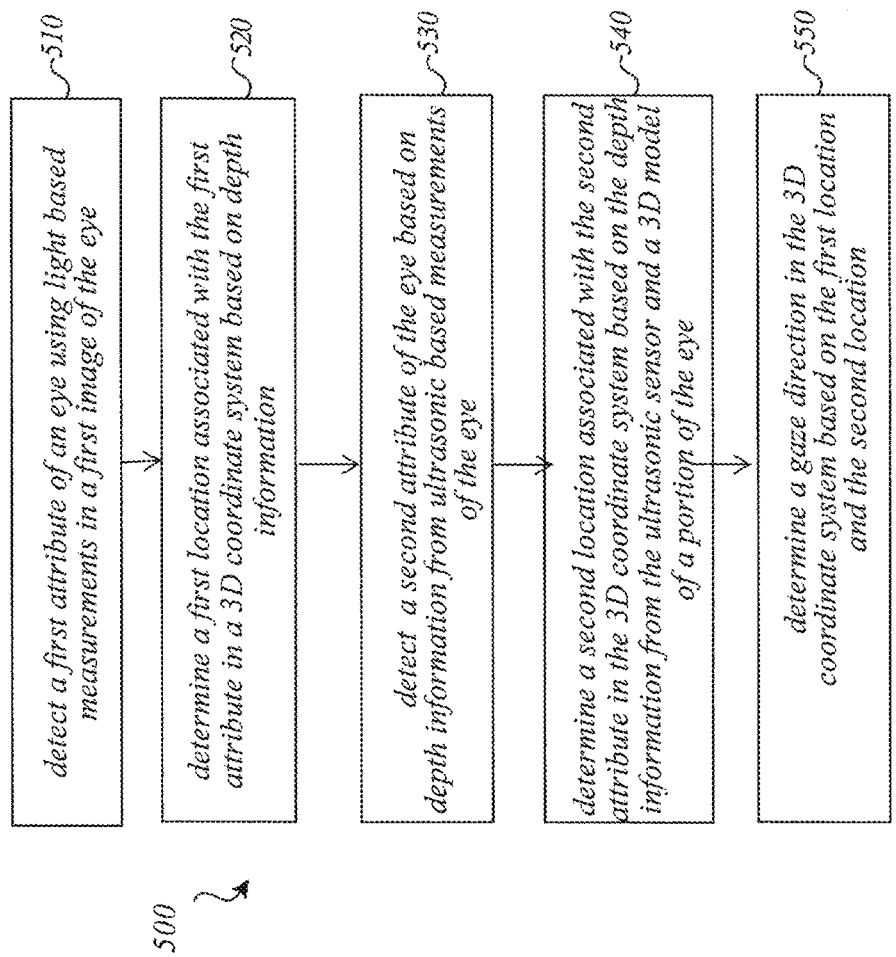
FIG. 5 is a flowchart illustrating an exemplary method of gaze tracking in accordance with some implementations.

FIG. 5 is a flowchart illustrating an exemplary method of hybrid gaze tracking that uses both imaging data and ultrasound data. Hybrid gaze tracking is more robust than either approach alone because imaging data is less affected by temperature, pressure, and air flow, and ultrasound data is less affected by stray light. In some implementations, different combinations of ultrasound data and light-based measurement data are used to effectively counter environmental noise, obtain desired accuracy, obtain desired power consumption rates, or combinations thereof. In some implementations, user authentication is improved by including additional ultrasonic biometric characteristics to image biometric characteristics. In some implementations, the method 500 is performed by a device (e.g., electronic device 600 of FIG. 6). The method 500 can be performed using an electronic device or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory). In some implementations, the method 500 is performed by an electronic device having a processor.

At block 510, the method 500 detects a first attribute of an eye using light-based measurements in a first image of the eye. In some implementations, a portion of the eye (e.g., sclera, limbus, iris, pupil, etc.) is identified in the first image based on pixel differences associated with different wavelengths of light in a color image, an RGB image, a flood-IR image, or the like. In some implementations, the cornea is identified using the first image based one or more glints (e.g., cornea reflection) from an illumination source (e.g., IR/NIR light source or LEDs) reflecting off the cornea. Alternatively, the first image is from a depth camera.

At block 520, the method 500 determines a first location associated with the first attribute in a three dimensional (3D) coordinate system based on depth information. In some implementations, the first location is a location along the optical axis such as a rotation center of the eye, a cornea center, a pupil center, or the like. In some implementations, the detected portion of the eye (e.g., sclera, iris plane, limbus) and the depth information (e.g., a depth map) from a depth sensor is used to determine where the detected portion of the eye is located (e.g., pose) in 3D space, which can be used to determine a location along the optical axis of the eye. For example, the pose of the iris/limbus and a 3D eye model are used determine a location of the rotation center of the eye or an iris center in the 3D space. In some implementations, corneal glint(s) are detected in the first image and the cornea can be identified based on one or more glint detections and depth information. Then, the center of the cornea is the first location. For example, the glint and depth information can identify where the cornea is in 3D space (e.g., an orientation or a spherical surface), which can be used to estimate a 3D location of the center of the cornea. The depth information for the glints in the first image can be based on the spatial relationship of an illumination source and image sensor and the glint location in the image or based on a depth sensor. In some implementations, the depth information is based on a model such as a 3D model of the eye or a 3D pose of the eye based on 2D image information of a portion of the eye having known dimensions.

In some implementations, the depth information is based on stereoscopic imaging or paired stereoscopic images. In some implementations, the depth information is based on two stereo image sensors with a known spatial relationship that capture an image of the first attribute.

At block 530, the method 500 detects a second attribute of the eye based on depth information from ultrasonic based measurements of the eye. In some implementations, an ultrasound system includes an ultrasound sensor that operates around 1 megahertz frequency and ultrasonic emissions from one or more ultrasound transmitters are reflected off the surface of the eye (e.g., cornea surface, sclera surface, limbus surface, etc.) and detected by one or more ultrasound receivers. Based on the spatial arrangement between the ultrasound transmitter and the timing of the detected reflection obtained by a set of ultrasound receivers (e.g., 4, 8, 10, 16), a distance measurement to the eye is obtained. In some implementations, the ultrasonic distance measurements to the eye can be detected at 100 Hz rate. In some implementations, a 2D array of 60, 100, 150 MPUTs are used in the ultrasound sensor as ultrasound receivers or ultrasound transmitters.

At block 540, the method 500 determines a second location associated with the second attribute in the 3D coordinate system based on the depth information from the ultrasound sensor and a 3D model of a portion of the eye. In some implementations, the second location is a position on the optical axis of the eye. For example, the cornea can be detected as a bulge on the eye and the detected cornea depth is used to identify where the cornea surface is in 3D space, which is used to determine a 3D location of the center of the cornea. In another example, the surface of portions of the sclera can be determined in the depth information from the ultrasound sensor and used to determine a 3D position of the rotation center of the eye.

At block 550, the method 500 determines a gaze direction in the 3D coordinate system based on the first location and the second location. In some implementations, the first location and the second location are on the optical axis of the eye and a line connecting these two points provides a gaze direction. In some implementations, a direction from the 3D eyeball rotation center to the 3D cornea center provides the gaze direction.

In some implementations, user authentication is improved by including additional ultrasonic biometric characteristics to image biometric characteristics. In some implementations, the shape of the eye (e.g., cornea) can be measured for different accommodation ranges and the measured shape changes are idiosyncratic with each individual and each eye of the individual. Thus, using the gaze tracking system 250, the shape of the eye of the user is detected at a preset frame rate and used to estimate the distance at which the user is focusing/looking.

In some implementations, the gaze direction includes a preset or determined angular offset (e.g., of the fovea) from the optical axis. One use of gaze tracking is to identify a point of regard (POR), for example, on a display of an electronic device.

In some implementations, in blocks 510 to 540, the 5D of the eye in space, namely a 3D position and 2D orientation is determined (e.g., 2D orientation includes "pan" and "tilt", but not "roll"). In some implementations, blocks 510-550 are repeatedly performed. In some implementations, the techniques disclosed herein may be implemented on a wearable device, such as an HMD having an optical see-through or opaque display, or an HMD having a tunable lens, or an HMD having both a display and tunable lens.

Figure 6:
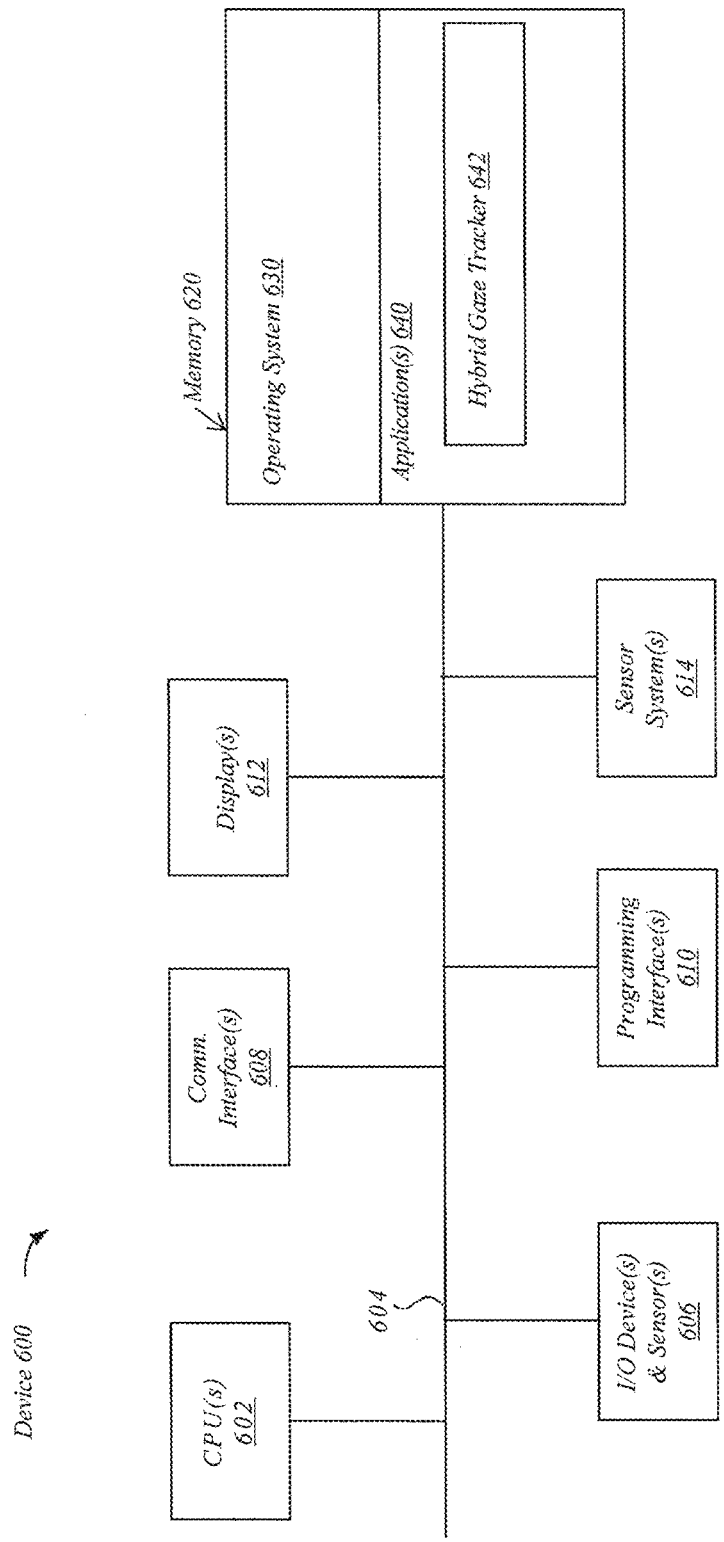
FIG. 6 illustrates an exemplary electronic device in accordance with some implementations.

FIG. 6 is a block diagram of an example device 600. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 600 includes one or more processing units 602 (e.g., microprocessors, ASICs, FPGAs, GPUs, CPUs, processing cores, or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 610, one or more displays 612, one or more interior or exterior facing sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 612 are configured to present content to the user. In some implementations, the one or more displays 612 correspond to holographic, digital light processing (DLP), liquid-crystal display (LCD), liquid-crystal on silicon object (LCoS), organic light-emitting field-effect transitory (OLET), organic light-emitting diode (OLED), surface-conduction electron-emitter display (SED), field-emission display (FED), quantum-dot light-emitting diode (QD-LED), microelectromechanical system (MEMS), or the like display types. In some implementations, the one or more displays 612 correspond to diffractive, reflective, polarized, holographic, etc. waveguide displays. For example, the electronic device 600 may include a single display. In another example, the electronic device 600 includes a display for each eye of the user.

In some implementations, the one or more sensor systems 614 include an image capture device or array that captures image data or an audio capture device or array (e.g., microphone) that captures audio data. The one or more image sensor systems 614 may include one or more RGB cameras (e.g., with a complimentary metal-oxide-semiconductor (CMOS) image sensor or a charge-coupled device (CCD) image sensor), monochrome cameras, IR cameras, or the like. The one or more sensor systems 614 may include inward or outward facing sensors. In some implementations, the one or more image sensor systems 614 further include an illumination source that emits light such as a flash. In some implementations, the one or more image sensor systems 614 further include an on-camera image signal processor (ISP) configured to execute a plurality of processing operations on the image data.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

In some implementations, the instruction set(s) 640 include a hybrid gaze tracker 642 that is executable by the processing unit(s) 602 to perform gaze tracking using imaging data and ultrasound data according to one or more of the techniques disclosed herein.

Although the instruction set(s) 640 are shown as residing on a single device, it should be understood that in other implementations, any combination of the elements may be located in separate computing devices. FIG. 6 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device. Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method, comprising: at a device having one or more processors and one or more sensors,
   detecting a first attribute of an eye using selectively enabled light-based measurements in a first image of the eye;
   determining a first location associated with the first attribute in a three dimensional (3D) coordinate system based on first depth information;
   detecting a second attribute of the eye based on second depth information from ultrasonic based measurements of the eye, wherein the ultrasonic based measurements selectively trigger the light-based measurements based on eye movements of the eye exceeding a threshold amount;

determining a second location associated with the second attribute in the 3D coordinate system based on the second depth information and a 3D model of a portion of the eye; and determining a gaze direction in the 3D coordinate system based on the first location and the second location.

2. The method of claim 1, wherein detecting the first attribute is based on pixel differences associated with different wavelengths of light in the first image.

3. The method of claim 1, wherein detecting the first attribute comprises identifying an eye structure of the eye based on color differences in an RGB image corresponding to ambient light or differences in an infrared (IR) image corresponding to reflected flood IR light emitted from an illumination source.

4. The method of claim 1, wherein determining the first location is based on a portion of a depth map corresponding to an eye region of the first image.

5. The method of claim 1, wherein determining the first location comprises locating a position on the optical axis using the detected first attribute and the depth information from a depth sensor or a corresponding 3D point cloud.

6. The method of claim 1, wherein determining the first location comprises locating a position on the optical axis using the detected first attribute and a 3D model of the eye.

7. The method of claim 1, wherein detecting the first attribute is based on a glint resulting from light of an illumination source reflecting off a cornea of the eye.

8. The method of claim 7, wherein determining the first location comprises locating the cornea using the detected glint and the first depth information or locating a cornea center.

9. The method of claim 1, wherein the one or more sensors include a red-green-blue (RGB) image sensor, an infrared (IR) sensor, or a depth sensor, wherein a depth sensor provides the first depth information, and the depth sensor uses time-of-flight data, structured light projection data, triangulation data, or stereo data, and wherein the IR sensor is configured to capture the first depth information and IR images of glints for cornea detection.

10. The method of claim 1, wherein the second depth information from ultrasonic based measurements of the eye is provided by an ultrasound sensor comprising:

at least one ultrasonic transmitter configured to transmit ultrasonic sound towards the eye; and a plurality of ultrasonic receivers configured to receive an echo generated by interaction of the ultrasonic sound with the eye, the plurality of ultrasonic receivers provided in a prescribed spatial arrangement with respect to the at least one ultrasonic transmitter.

11. The method of claim 10, wherein the plurality of ultrasonic receivers receive the echo generated by the ultrasonic sound reflecting off a surface of the eye.

12. The method of claim 1, wherein the second attribute of the eye is a cornea of the eye and the second location is a cornea center based on the 3D model of the eye.

13. The method of claim 1, wherein the second attribute of the eye is a sclera of the eye and the second location is a rotation center of the eye based on the 3D model of the eye.

14. The method of claim 1 further comprising determining a point of regard on the device based on the gaze direction and location of the device.

15. The method of claim 1, wherein the ultrasonic based measurements are always enabled.

16. The method of claim 1, further comprising:
switching between using only the ultrasonic based measurements and using only the selectively enabled light-based measurements and corresponding depth data from a depth sensor.

17. The method of claim 1, further comprising:
alternately operating in a plurality of gaze tracking modes, where each mode of the gaze tracking modes uses different combinations of data of the ultrasonic based measurements and data of the light-based measurements.

18. The method of claim 1, wherein the selectively enabled light-based measurements comprise imaging data used with respect to a selected frame rate, and wherein the ultrasonic based measurements are used to fill in between frames of the imaging data at the selected frame rate.

19. An electronic device comprising:
an image sensor configured to obtain images of the eye based on light reflecting off an eye to detect a first attribute of an eye using selectively enabled light-based measurements in a first image of the eye and determine a first location associated with the first attribute in a three dimensional (3D) coordinate system based on first depth information;
an ultrasound sensor comprising:
at least one ultrasonic transmitter configured to transmit ultrasonic sound towards the eye; and
at least one ultrasonic receiver configured to receive an echo generated by interaction of the ultrasonic sound with the eye, wherein the ultrasound sensor is configured to obtain depth information of the eye in the 3D coordinate system to detect a second attribute of the eye based on second depth information from ultrasonic based measurements of the eye configured to selectively trigger the light-based measurements based on eye movements of the eye exceeding a threshold amount and determine a second location associated with the second attribute in the 3D coordinate system based on the second depth information and a 3D model of a portion of the eye; and
a processor configured to perform gaze tracking using the image sensor and the ultrasound sensor to determine a gaze direction in the 3D coordinate system based on the first location and the second location.

20. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
detecting a first attribute of an eye using selectively enabled light-based measurements in a first image of the eye;
determining a first location associated with the first attribute in a three dimensional (3D) coordinate system based on first depth information;
detecting a second attribute of the eye based on second depth information from ultrasonic based measurements of the eye, wherein the always enabled ultrasonic based measurements selectively trigger the light-based measurements based on eye movements of the eye exceeding a threshold amount;

determining a second location associated with the second attribute in the 3D coordinate system based on the second depth information and a 3D model of a portion of the eye; and determining a gaze direction in the 3D coordinate system based on the first location and the second location.

\* \* \* \* \*